US008363516B2

(12) United States Patent  
Feng et al.

(10) Patent No.: US 8,363,516 B2
(45) Date of Patent: Jan. 29, 2013

(54) METHOD AND APPARATUS FOR COMPENSATING ASTIGMATISM IN AN OPTICAL STORAGE SYSTEM

(75) Inventors: Wen-Chun Feng, Taipei (TW); Chien-Liang Yeh, Kaohsiung (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 696 days.

(21) Appl. No.: 12/349,663

(22) Filed: Jan. 7, 2009

(65) Prior Publication Data

US 2009/0238048 A1    Sep. 24, 2009

(30) Foreign Application Priority Data

Mar. 20, 2008  (TW) ................................ 97109870 A

(51) Int. Cl.
 *G11B 7/00* (2006.01)

(52) U.S. Cl. ................ 369/44.23; 369/44.25; 369/44.27

(58) Field of Classification Search .......................... None
See application file for complete search history.

(56) References Cited

U.S. PATENT DOCUMENTS

| 4,878,211 | A | * | 10/1989 | Suzuki et al. ............. 369/44.35 |
| 6,567,354 | B2 | | 5/2003 | Yanagawa |
| 2005/0047311 | A1 | | 3/2005 | Sato et al. |
| 2006/0067196 | A1 | * | 3/2006 | Tanimoto et al. ........ 369/112.01 |
| 2006/0289751 | A1 | * | 12/2006 | Watanabe et al. ............. 250/310 |
| 2007/0183274 | A1 | * | 8/2007 | Kudo et al. ................ 369/44.23 |
| 2009/0028013 | A1 | * | 1/2009 | Lin ............................ 369/47.1 |

FOREIGN PATENT DOCUMENTS

| TW | 200715278 A | 4/2007 |
| TW | 200721151 A | 6/2007 |

OTHER PUBLICATIONS

Taiwan Patent Office Action issued on Nov. 30, 2011.

* cited by examiner

*Primary Examiner* — Lixi C Simpson
(74) *Attorney, Agent, or Firm* — WPAT PC; Justin King

(57) ABSTRACT

The present invention discloses a method and an apparatus for compensating astigmatism in an optical storage system. Firstly, the optical storage system focuses on an optical disc and proceeds track seeking. While track seeking, the astigmatism compensator continues adjusting and an astigmatism index signal is also measured. At last, an optimal astigmatism compensated value of the astigmatism compensator is acquired based on the measured result of the astigmatism index signal.

6 Claims, 10 Drawing Sheets vertical plane horizontal plane

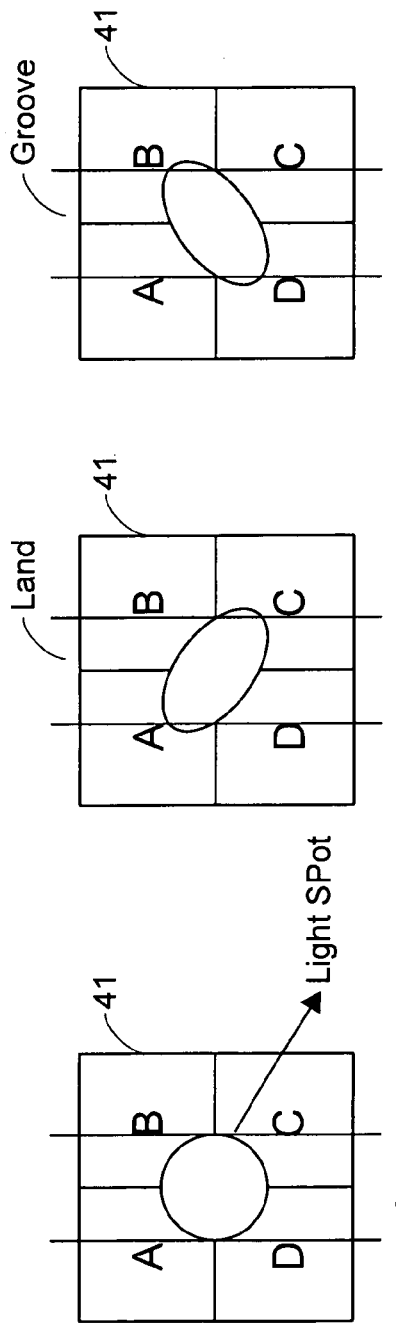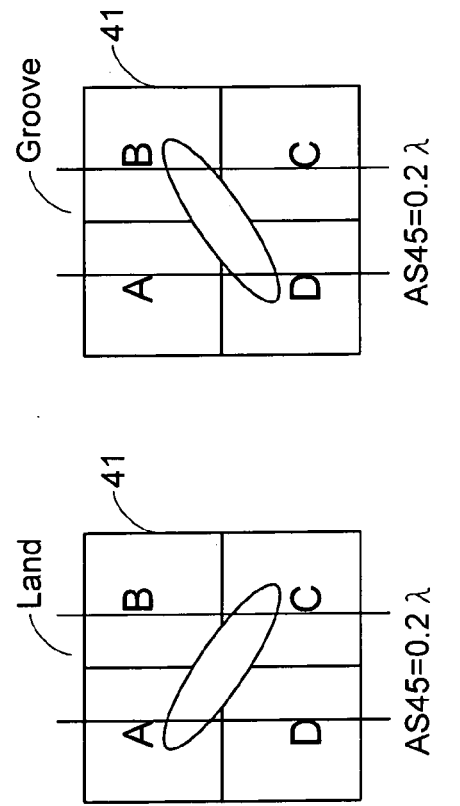

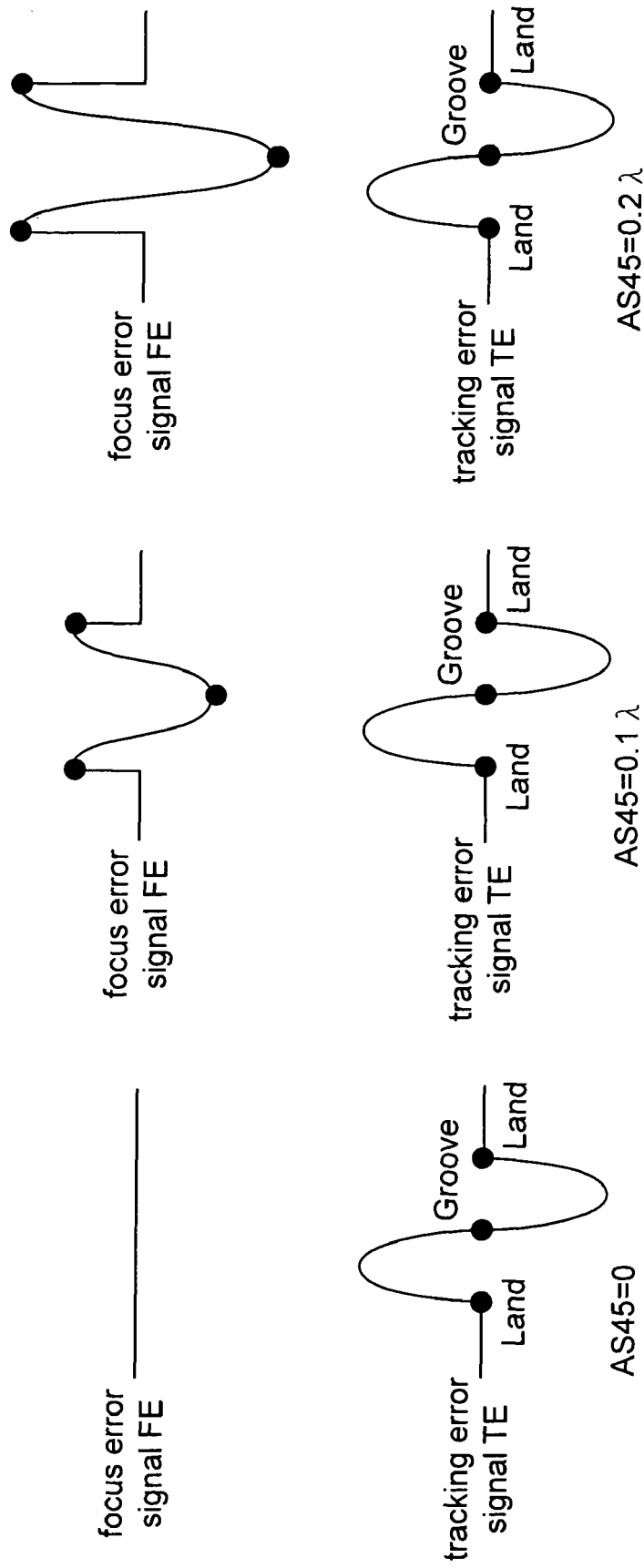

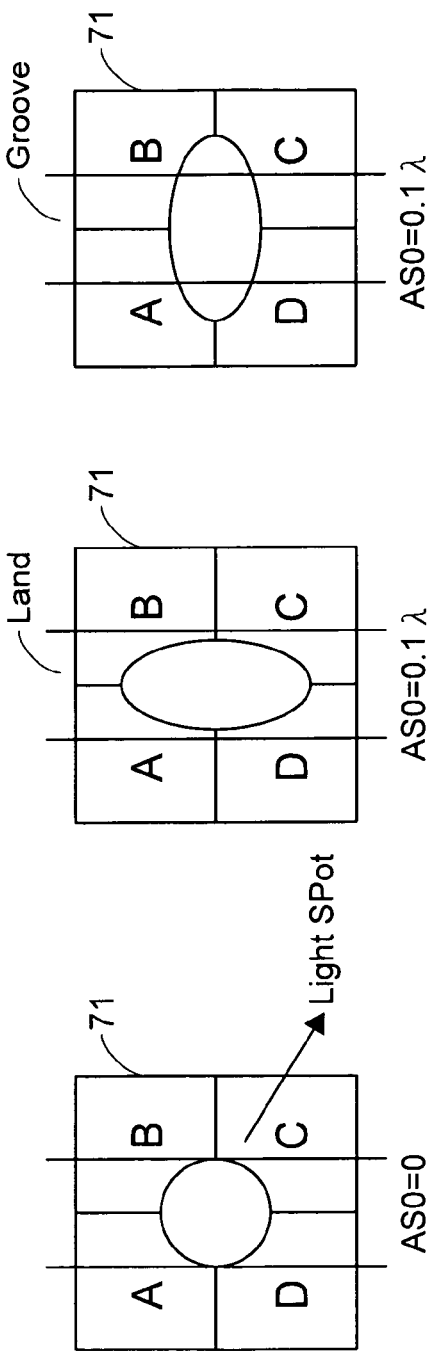
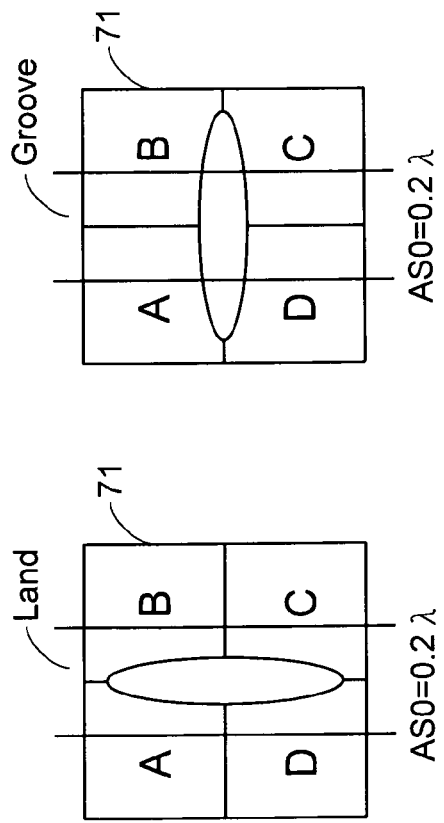

METHOD AND APPARATUS FOR COMPENSATING ASTIGMATISM IN AN OPTICAL STORAGE SYSTEM

FIELD OF THE INVENTION

The present invention relates to a method and an apparatus for compensating astigmatism in an optical storage system, and more particularly to a method and an apparatus for compensating astigmatism AS45 and astigmatism AS0.

BACKGROUND OF THE INVENTION

The performance of an optical storage system is greatly related to the optical quality of the inner system and astigmatism is one of important factors for degrading the optical quality of the inner system. When the inner optical quality of the optical storage system is affected by astigmatism, the focus error signal and the tracking error signal generated by the optical storage system are easily distorted so that the servo control becomes more difficult and the unfocused condition or off-track condition may happen. Moreover, the deformed light spot of the read/write laser beam of the optical storage system resulted from astigmatism causes more errors in radio frequency signal when reading discs and poor write quality of the optical storage system.

Refer to FIG. 1, which illustrates astigmatism. An optical storage system with astigmatism is one where laser beam passes through objective lenses and propagate in two perpendicular planes have different foci. The light spot at the focal plane becomes elliptic. An included angle of 45 degrees is formed between the major axis of the elliptic light spot and tracks of the optical disc read/written by the optical storage system when the optical storage system is with astigmatism AS45. And an included angle of zero degrees is formed between the major axis of the elliptic light spot and tracks of the optical disc read/written by the optical storage system when the optical storage system is with astigmatism AS0.

Take astigmatism AS45 for example, the light spot of the optical storage system with astigmatism AS45 causes feed-through phenomenon that the focus error signal (FE) shows ripples when the elliptic light spot moves across tracks. The feed-through phenomenon becomes more obvious when the optical disc, such as DVD+R or DVD-R, has lands and grooves. When astigmatism AS45 becomes more serious, the major axis and the minor axis of the elliptic light spot differ more, so that the asymmetry of the light spot becomes more obvious. The focus error signal (FE) thus vibrates more which may lead to that the focus servo loses control. Therefore the optical pickup head with astigmatism AS45 is compensated to increase the stability of the focus servo control.

Therefore, optical pickup head manufactures compensate astigmatism AS45 and astigmatism AS0 so that read/write quality of the optical storage system are less affected by astigmatism AS45 and astigmatism AS0. FIG. 2 illustrates a conventional optical storage system. The optical storage system comprises a blu-ray (BD) laser beam source 21, a DVD laser beam source 22 and a CD laser beam source 23 for reading different kinds of discs. The BD laser beam source 21, the DVD laser beam source 22 and the CD laser beam source 23 passes through an objective lens 24 and then focuses on data layer of the optical disc 25. The reflected laser beam projects on the light detectors 26 which transfer the light signal into an electrical signal. The electrical signal is then calculated by the digital signal processor (DSP) 28 of the control unit 27, and thus a focus error signal (FE) and main push-pull signal (MPP) are acquired. Wherein the control unit 27 controls turning on/off the BD laser beam source 21, the DVD light source 22 and the CD light source 23, and an astigmatism compensated value is inputted to an astigmatism compensator 29 so that the read/write quality of the optical storage system is improved. The astigmatism compensator 29 is usually composed of liquid crystal material. The refractive index of the astigmatism compensator is varied with the inputted voltage level, thus the laser beam which passes through the astigmatism compensator 29 is compensated so that the shape of the light spot which the laser beam reaches the optical disc 25 is circular. Therefore, the optical storage system may maintain the best read/write quality.

In one conventional method, recommended compensated values for astigmatism AS45 and astigmatism AS0 are provided by the optical pickup head manufacturers. These recommended compensated values for astigmatism AS45 and astigmatism AS0 are fixed without any flexibility. However, recommended compensated values provided by the optical pickup head manufacturers are usually not optimal compensated values required by the optical storage system. Because the optimal compensated values are affected by environment variation, aging of the optical pickup heads, discs played or even usage variation (vertical or horizontal position). Moreover, the development of the optical storage system has entered blu-ray generation, the optical quality of the optical pickup head therefore demands higher standard. Thus, if only the recommended compensated values for astigmatism AS45 and astigmatism AS0 provided by the optical pickup head manufacturers are considered, the distortion of the optical signals in the optical storage system which results in the optical storage system read/write fail still happens when astigmatism AS45 or astigmatism AS0 occurs. Therefore, it is important to effectively compensate astigmatism AS45 and astigmatism AS0.

SUMMARY OF THE INVENTION

An object of the present invention is to provide a method and an apparatus for compensating astigmatism in an optical storage system so as to resolve the forementioned problem. The distortion of the optical signal in the optical storage system is thus improved in the present invention so that the read/write quality of the optical storage system is enhanced.

In order to attain the foregoing object, the present invention provides a method and an apparatus for compensating astigmatism in an optical storage system. Firstly, the optical storage system focuses on an optical disc and proceeds track seeking. While track seeking, the astigmatism compensator continues adjusting and an astigmatism index signal is also measured. At last, an optimal astigmatism compensated value of the astigmatism compensator is acquired based on the measured result of the astigmatism index signal.

In order to attain the foregoing object, the present invention provides an apparatus for compensating astigmatism in an optical storage system which comprises an optical pickup head, a logic comparison unit, a memory, a control unit and an astigmatism compensator. The optical pickup head, which comprises a photo detector, an operation unit and a peak-to-peak detector, generates an astigmatism index signal based on the detector signal of the photo detector. The logic comparison unit compares the astigmatism index signal with the initial peak-to-peak signal stored in the memory to output an optimal astigmatism compensated value. And the control unit outputs a control signal to the astigmatism compensator to compensate astigmatism.

BRIEF DESCRIPTION OF THE DRAWINGS

The above contents of the present invention will become more readily apparent to those ordinarily skilled in the art after reviewing the following detailed description and accompanying drawings, in which:

FIG. 3A is a diagram illustrating a light spot projected on the PDIC when the optical storage system is without astigmatism AS45.

FIG. 3B is a diagram illustrating a light spot projected on the PDIC when the optical storage system is slightly affected by astigmatism AS45.

FIG. 3C is a diagram illustrating a light spot projected on the PDIC when the optical storage system is slightly affected by astigmatism AS45.

FIG. 3D is a diagram illustrating a diagram illustrating a light spot projected on the PDIC when the optical storage system is seriously affected by astigmatism AS45.

FIG. 3E is a diagram illustrating a diagram illustrating a light spot projected on the PDIC when the optical storage system is seriously affected by astigmatism AS45.

FIG. 4A is a diagram illustrating the wave diagram of the tracking error signal and the focus error signal when the optical storage system is not affected by astigmatism AS45.

FIG. 4B is a diagram illustrating the wave diagram of the tracking error signal and the focus error signal when the optical storage system is slightly affected by astigmatism AS45.

FIG. 4C is a diagram illustrating the wave diagram of the tracking error signal and the focus error signal when the optical storage system is seriously affected by astigmatism AS45.

FIG. 6A is a diagram illustrating a light spot projected on the PDIC when the optical storage system is without astigmatism AS0.

FIG. 6B is a diagram illustrating a light spot projected on the PDIC when the optical storage system is slightly affected by astigmatism AS0.

FIG. 6C is a diagram illustrating a light spot projected on the PDIC when the optical storage system is slightly affected by astigmatism AS0.

FIG. 6D is a diagram illustrating a diagram illustrating a light spot projected on the PDIC when the optical storage system is seriously affected by astigmatism AS0.

FIG. 6E is a diagram illustrating a diagram illustrating a light spot projected on the PDIC when the optical storage system is seriously affected by astigmatism AS0.

DETAILED DESCRIPTION OF THE PREFERRED EMBODIMENT

Figure 1:
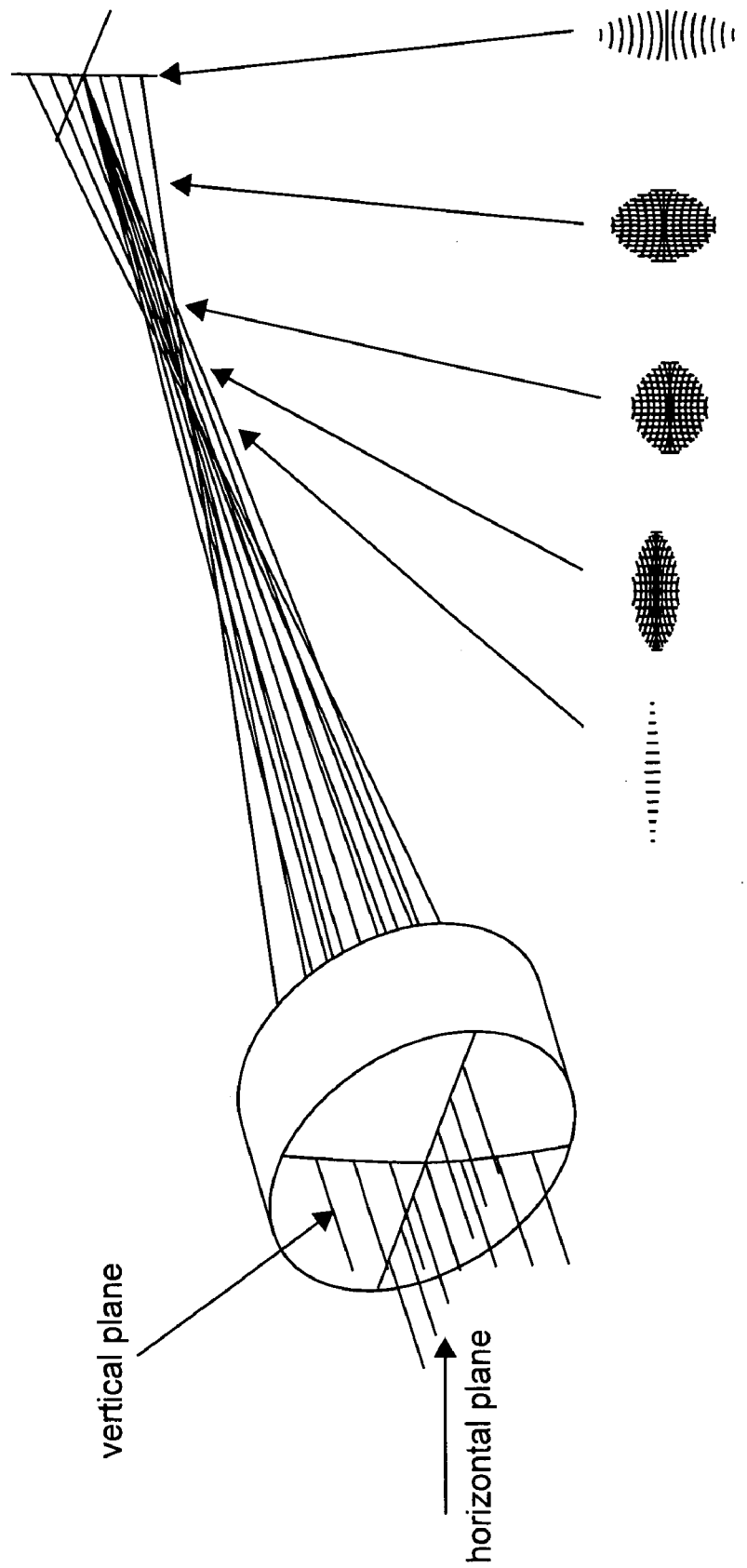
FIG. 1 is a diagram illustrating astigmatism.
Figure 2:
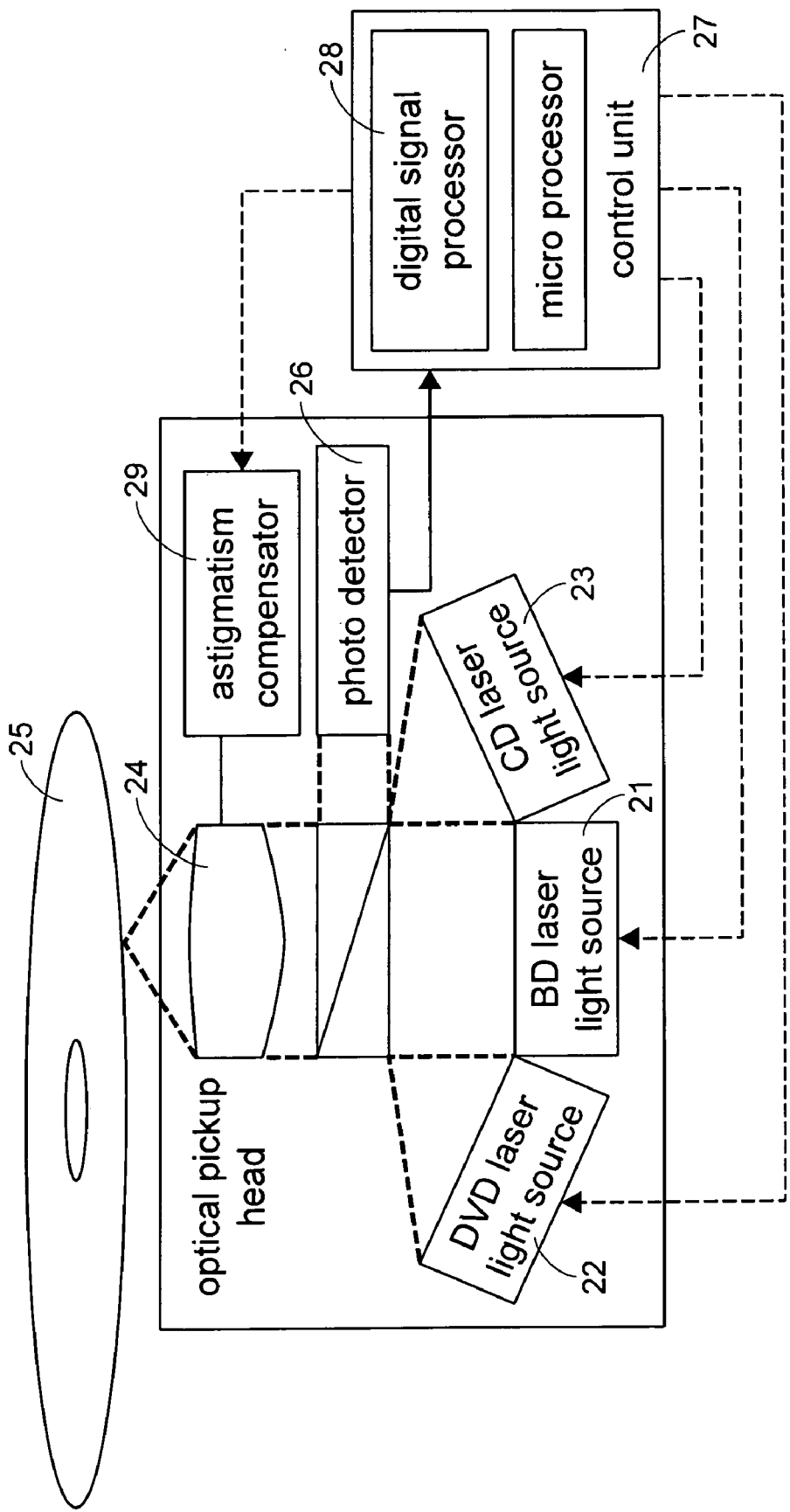
FIG. 2 is a diagram illustrating a conventional optical storage system.

FIGS. 3A, 3B, 3C, 3D, and 3E illustrate a light spot which is projected on the PDIC (photo detector integrated circuit) when the optical storage system is affected by astigmatism AS45. When the optical storage system is without astigmatism AS45 (AS45=0), the shape of the light spot is symmetric circular as shown in FIG. 3A. But when the optical storage system is slightly affected by astigmatism AS45 (AS45=0.1λ), the light spot which has an included angle of 45 degrees with tracks of the optical disc appears an ellipse shape as shown in FIG. 3B and FIG. 3C. FIG. 3B illustrates a light spot which is formed when the real/write laser beam reaches lands of the optical disc and projects to the photo detectors 41, and FIG. 3C illustrates a light spot which is formed when the real/write laser beam reaches grooves of the optical disc and projects to the photo detectors 41. Because lands and grooves of the optical disc have different depths, the path of laser beam passing through lands and the path of laser beam passing through grooves are different. Therefore, when the optical storage system is affected by slight astigmatism AS45, the light spot which reads/writes lands and the light spot which reads/writes grooves project on the photo detectors 41 with different direction which results in different focus error signals (FE). Moreover, the photo detectors 41 are composed of four parts of A, B, C and D detectors and focus error signal (FE) is calculated based on electrical signals acquired by the four detectors, i.e. (A+C)−(B+D). Therefore, when the light spot with slightly astigmatism AS45 reads/writes on lands of the optical disc, the corresponding focus error signal has positive level, i.e. FE>0. When the light spot with slightly astigmatism AS45 reads/writes grooves of the optical disc, the corresponding focus error signal has negative level, i.e. FE<0.

In the same way, when the optical storage system is seriously affected by astigmatism AS45 (AS45=0.2λ), the light spot which has an included angle of 45 degrees with tracks of the optical disc appears an ellipse shape as shown in FIG. 3D and FIG. 3E. FIG. 3D illustrates a light spot which is formed when the read/write laser beam reaches lands of the optical disc and projects to the photo detectors 41, and FIG. 3E illustrates a light spot which is formed when the read/write laser beam reaches grooves of the optical disc and projects to the photo detectors 41. Therefore, when the optical storage system is affected by serious astigmatism AS45, the length of the light spot differs in the major axis and in the minor axis. Moreover, when the light spot with serious astigmatism AS45 reads/writes on lands of the optical disc, the corresponding focus error signal has higher positive level, i.e. FE>>0. When the light spot with serious astigmatism AS45 reads/writes grooves of the optical disc, the corresponding focus error signal has higher negative level, i.e. FE<<0.

The shape of the light spot and the focus error signal are related to astigmatism AS45 from the above description. FIGS. 4A, 4B and 4C illustrate the relative relation of a tracking error signal and a focus error signal when the optical storage system which is affected by astigmatism AS45 proceeds track seeking.

FIG. 4A illustrates the waveform of the tracking error signal and the focus error signal when the optical storage system is not affected by astigmatism AS45 (AS45=0). Generally speaking, the optical storage system proceeds track seeking so that the light spot moves across lands and grooves of the optical disc. When the tracking error signal appears a sine wave, it represents the light spot moves across a track pitch, i.e. the light spot has been moved from a land, across a groove and then reached the next land. The focus error signal (FE) does not vary very much when the light spot moves across the land and the groove because the light spot is well focused.

Refer to FIGS. 4B and 4C, which illustrates the waveform of the tracking error signal and the focus error signal when the optical storage system is affected by astigmatism AS45. When the optical storage system generates a light spot with astigmatism AS45, i.e. the light spot has an included angle of 45 degrees with tracks, the focus error signal which is generated based on an astigmatism method, i.e. (A+C)−(B+D), is affected by the elliptical light spot. The amplitude of the focus error signal varies when the light spot moves across lands and grooves as shown in FIGS. 4B and 4C. When the astigmatism AS45 (AS45=0.1λ to AS45=0.2λ) becomes more serious, the length of the light spot differs much more in the major axis and in the minor axis so that the amplitude of the focus error signal varies even more.

Figure 5:
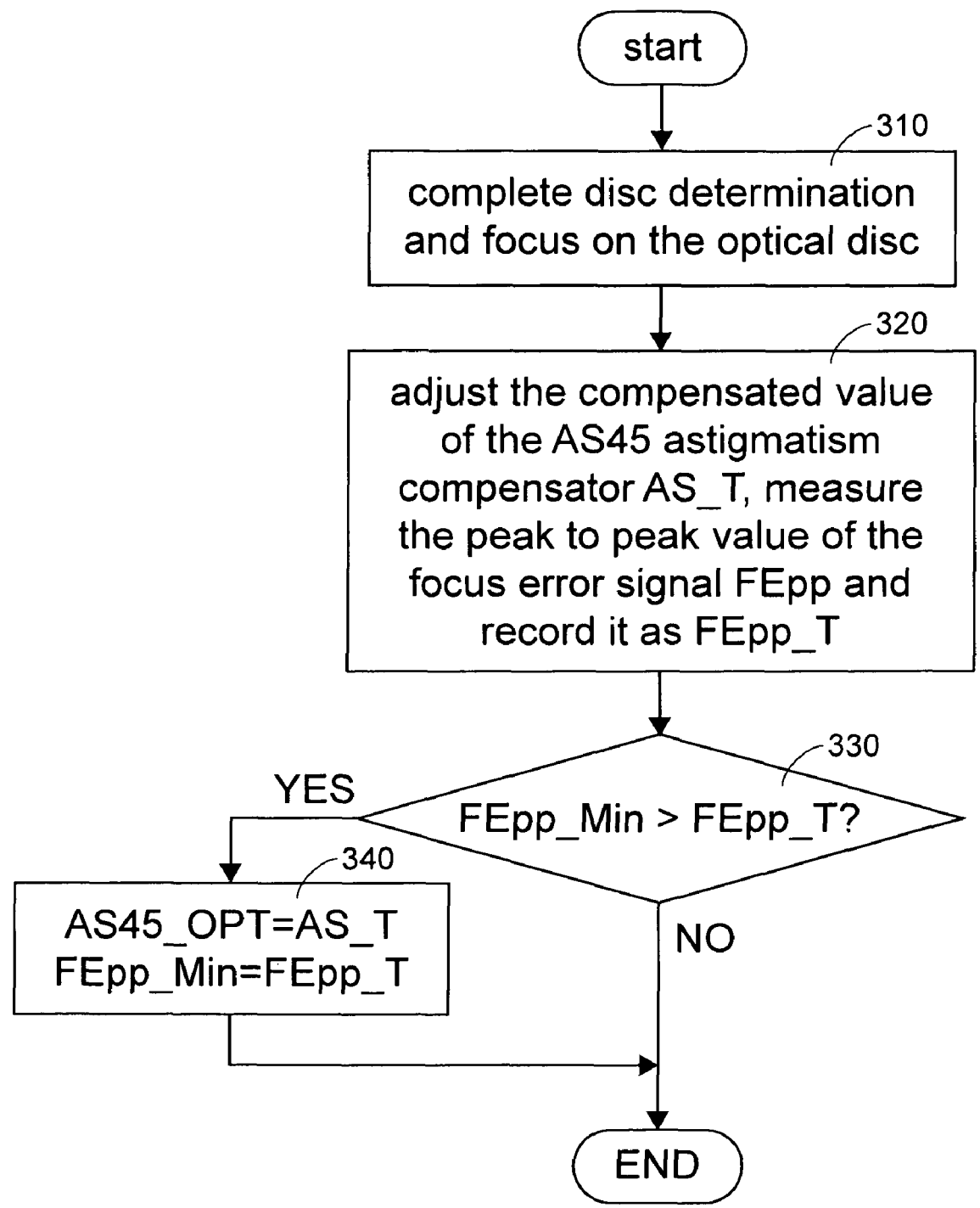
FIG. 5 is a diagram illustrating the flow chart of the method for compensating astigmatism AS45 in an optical storage system according to the present invention.

Therefore, the peak-to-peak value of the focus error signal acquired when the light spot moves across tracks is an effective index signal for determining and compensating astigmatism AS45. FIG. 5 illustrates the flow chart of the method for compensating astigmatism AS45 in an optical storage system according to the present invention. The method is performed when the optical storage system proceeds track seeking, i.e. the light spot moves across lands and grooves of the optical disc and step 310 to step 340 are executed a number of times to find the optimal compensated value for astigmatism AS45 AS45_OPT.

Step 310: disc type is determined and the optical disc is focused on;

Step 320: the compensated value of the AS45 astigmatism compensator AS_T is adjusted, the peak-to-peak value of the focus error signal FEpp is measured and recorded as FEpp_T.

Step 330: whether FEpp_Min is greater than FEpp_T is determined. If yes, proceeds step 340; if else, the method flow is terminated.

Step 340: the optimal compensated value for astigmatism AS45 AS45_OPT is replaced with AS45_T and FEpp_Min is replaced with FEpp_T.

When the light spot having no astigmatism AS45 (AS45=0) moves across lands and grooves of the optical disc as shown in FIG. 4A, the amplitude of the focus error signal does not vary, thus the peak-to-peak value of the focus error signal equals zero (FEpp=0). When the light spot having astigmatism AS45 (AS45=0.1λ) moves across lands and grooves of the optical disc as shown in FIG. 4B, the amplitude of the focus error signal varies, thus the peak-to-peak value of the focus error signal is greater than zero (FEpp>0). When the light spot with astigmatism AS45 (AS45=0.2λ) moves across lands and grooves of the optical disc as shown in FIG. 4C, the amplitude of the focus error signal varies even more, thus the peak-to-peak value of the focus error signal is much greater than zero (FEpp>>0).

The optical characteristics described above are therefore applied to acquire the optimal compensated value for astigmatism AS45. That is to say, the compensated value of the astigmatism AS45 compensator is adjusted and the peak-to-peak value of the focus error signal FEpp is also measured when the optical storage system proceeds track seeking. The compensated value for astigmatism AS45 is continuously adjusted until the peak-to-peak value of the focus error signal FEpp becomes minimum. The shape of the light spot is quite close to a symmetric circular when astigmatism AS45 becomes minimum. Astigmatism AS45 is thus compensated.

Figure 9:
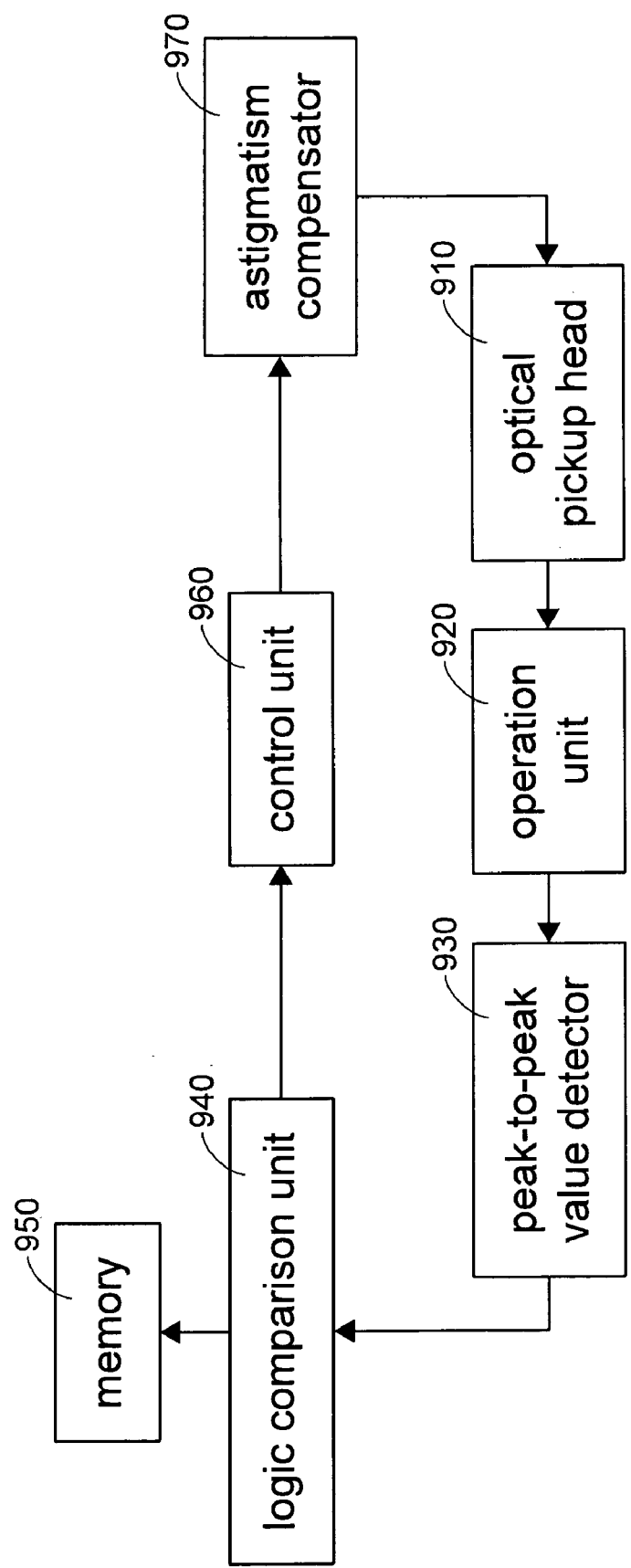
FIG. 9 is a diagram illustrating the system structure for compensating astigmatism AS45 and astigmatism AS0 according to the present invention.

Hence, during the period which the optical storage system has focused on the optical disc (step 310) and before the optical storage system hasn't tracked on, the light spot moves across tracks, the compensated value of the astigmatism AS45 compensator AS_T is adjusted and the peak-to-peak value of the focus error signal FEpp is also measured and recorded as FEpp_T (step 320). FEpp_T is compared with FEpp_min which is stored in the memory (as FIG. 9 shown) so that the corresponding compensated value AS45_OPT with minimum FEpp is acquired. AS45_OPT is the optimal compensated value for astigmatism AS45 (step 340). That is to say, step 310 to step 340 are executed a number of times and the optimal compensated value for astigmatism AS45 AS45_OPT is acquired.

FIGS. 6A, 6B, 6C, 6D, and 6E illustrate a light spot which is projected on the PDIC when the optical storage system is affected by astigmatism AS0. When the optical storage system having no astigmatism AS0 (AS0=0), the shape of the light spot is symmetric circular as shown in FIG. 6A. But when the optical storage system is slightly affected by astigmatism AS0 (AS0=0.1λ), a light spot of the read/write laser beam which reaches lands of the optical disc and projects to the photo detectors 71 appears an ellipse shape and has an included angle of zero degrees with tracks of the optical disc as shown in FIG. 6B, and a light spot of the read/write laser beam which reaches grooves of the optical disc and projects to the photo detectors 71 appears an ellipse shape and has an included angle of 90 degrees with tracks of the optical disc as shown in FIG. 6C. Because lands and grooves of the optical disc have different depths, the path of laser beam passing through lands and the path of laser beam passing through grooves are different, which results in that the light spots projected on the PDIC have different included angels. Therefore, when the optical storage system is affected by slight astigmatism AS0, the shape variation of the light spot causes slight mismatch between the light spot and the track pitch of the optical disc. Besides, the main push pull signal (MPP) becomes harder to be detected by the optical storage system.

In the same way, when the optical storage system is seriously affected by astigmatism AS0 (AS0=0.2λ), a light spot of the read/write laser beam which reaches lands of the optical disc and projects to the photo detectors 71 appears an ellipse shape and has an included angle of zero degrees with tracks of the optical disc as shown in FIG. 6D, and a light spot of the read/write laser beam which reaches grooves of the optical disc and projects to the photo detectors 71 appears an ellipse shape and has an included angle of 90 degrees with tracks of the optical disc as shown in FIG. 6E. Therefore, when the optical storage system is affected by serious astigmatism AS0, the shape variation of the light spot causes serious mismatch between the light spot and the track pitch of the optical disc. Besides, the main push pull signal (MPP) becomes even harder to be detected by the optical storage system.

Figure 7A:
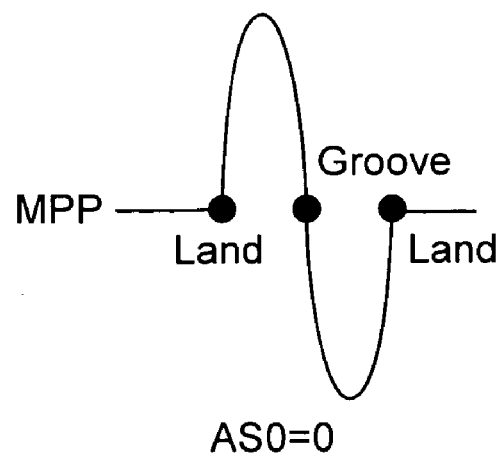
FIG. 7A is a diagram illustrating the wave diagram of the main push pull signal when the optical storage system is not affected by astigmatism AS0.
Figure 7B:
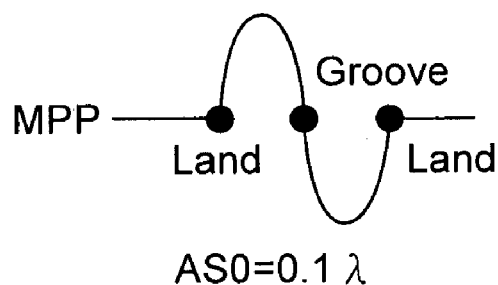
FIG. 7B is a diagram illustrating the wave diagram of the main push pull signal when the optical storage system is slightly affected by astigmatism AS0.
Figure 7C:
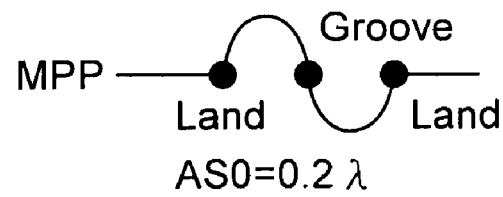
FIG. 7C is a diagram illustrating the wave diagram of the main push pull signal when the optical storage system is seriously affected by astigmatism AS0.

The shape of the light spot and the main push pull signal are related to astigmatism AS0 from the above description. FIGS. 7A, 7B and 7C illustrate a main push pull signal when the optical storage system which is affected by astigmatism AS0 proceeds track seeking.

FIG. 7A illustrates the waveform of the main push pull signal when the optical storage system is not affected by astigmatism AS0 (AS0=0). Generally speaking, the optical storage system proceeds track seeking so that the light spot moves across lands and grooves of the optical disc. The main push pull signal (MPP) is quite easy to be detected and the peak-to-peak value of the main push pull signal (MPPpp) is maximum because the size of the light spot is close to the track pitch.

Refer to FIGS. 7B and 7C, which illustrates the wave diagram of the main push pull signal when the optical storage system is affected by astigmatism AS0. When there's slight astigmatism AS0 (AS0=0.1λ) in the optical storage system, the diameter of the light spot in the direction which is perpendicular to the tracks becomes wider so which results in mismatch between the light spot and the track pitch and main push pull signal becomes harder to be detected by the optical storage system. The peak-to-peak value of the main push pull signal (MPPpp) thus decreases as shown in FIG. 7(B). When there's serious astigmatism AS0 (AS0=0.2λ) in the optical storage system, the distortion of the main push pull signal becomes more serious. The peak-to-peak value of the main push pull signal (MPPpp) thus decreases more as shown in FIG. 7(C).

Figure 8:
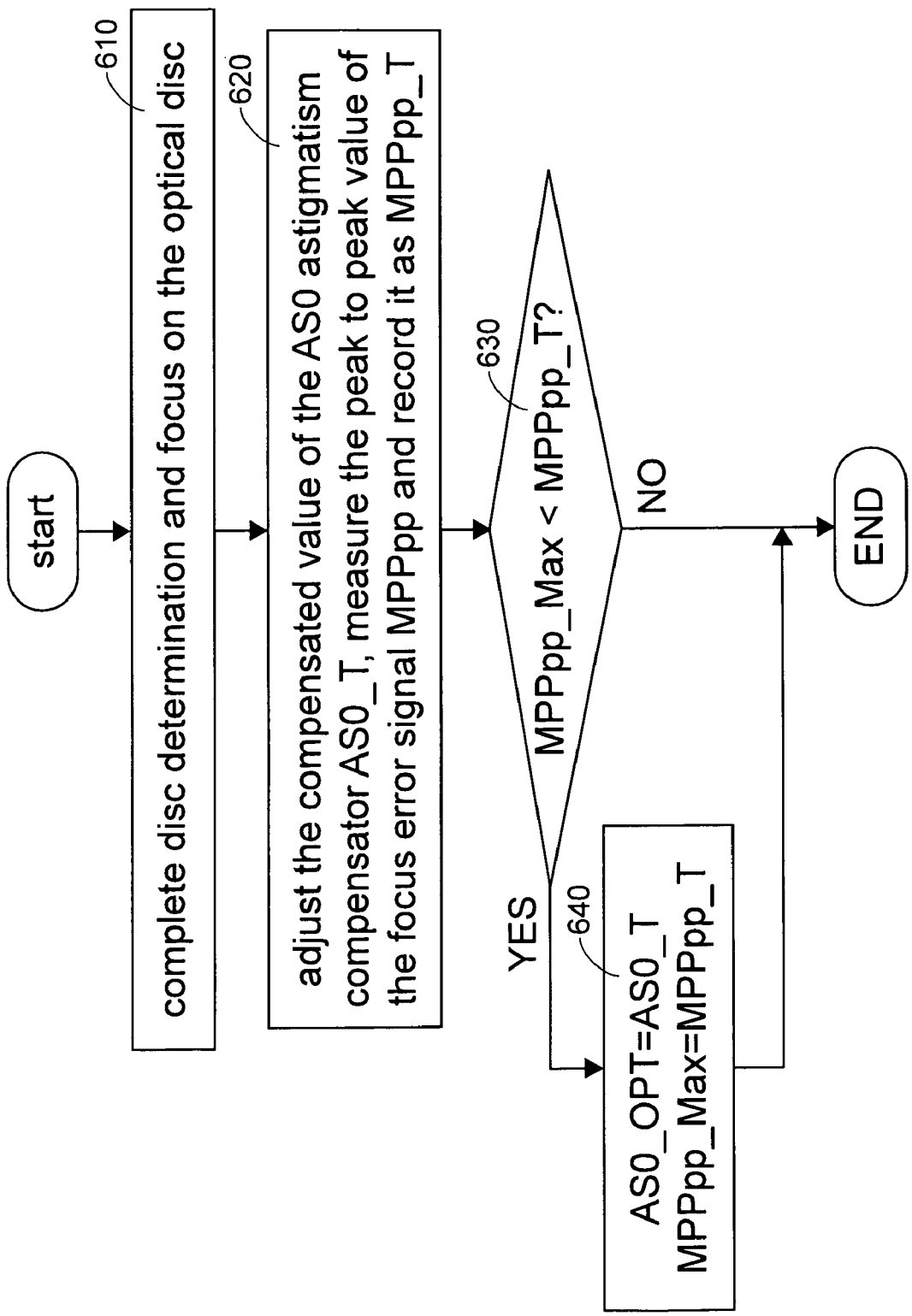
FIG. 8 is a diagram illustrating the flow chart of the method for compensating astigmatism AS0 in an optical storage system according to the present invention.

Therefore, the peak-to-peak value of the main push pull signal acquired when the light spot moves across tracks is an effective index signal for determining and compensating astigmatism AS0. FIG. 8 illustrates the flow chart of the method for compensating astigmatism AS0 in an optical storage system according to the present invention. The method is proceeded when the optical storage system proceeds track seeking, i.e. the light spot moves across lands and grooves of the optical disc and step 610 to step 640 are executed a number of times to find the optimal compensated value for astigmatism AS0 AS0_OPT.

Step 610: disc type is determined and the optical disc is focused on;

Step 620: the compensated value of the AS0 astigmatism compensator AS0_T is adjusted, the peak-to-peak value of the focus error signal MPPpp is measured and recorded as MPPpp_T.

Step 630: whether MPPpp_Max is smaller than MPPpp_T is determined. If yes, proceeds step 640; if else, the method flow is terminated.

Step 640: the optimal compensated value for astigmatism AS0 AS0_OPT is replaced with AS0_T and MPPpp_Max is replaced with MPPpp_T.

Therefore, the main push pull signal acquired when the optical storage system proceeds track seeking is an effective index signal for astigmatism AS0. The compensated value for astigmatism AS0 is continuously adjusted until the peak-to-peak value of the main push pull signal MPPpp becomes maximum so that the astigmatism AS0 is also minimum Hence, during the period which the optical storage system has focused on the optical disc (step 610) and before the optical storage system hasn't tracked on, the light spot moves across tracks, the compensated value of the astigmatism AS0 compensator AS_T is adjusted and the peak-to-peak value of the main push pull signal MPPpp is also measured and recorded as MPPpp_T (step 620). MPPpp_T is compared with MPPpp_Max which is stored in the memory (as FIG. 9 shown) (step 630) so that the corresponding compensated value AS0_OPT with maximum MPPpp is acquired. AS0_OPT is the optimal compensated value for astigmatism AS0 (step 640). That is to say, step 610 to step 640 are executed a number of times and the optimal compensated value for astigmatism AS0 AS0_OPT is acquired.

It is to be noted that the method for compensating astigmatism AS45 and for compensating astigmatism AS0 described above may be executed during the startup of the optical storage system so that the optical storage system may read/write without wasting time for acquiring the optimal compensated value for astigmatism AS45 and astigmatism AS0.

FIG. 9 illustrates the system structure for compensating astigmatism AS45 and astigmatism AS0 according to the present invention. After the photo detectors (not shown) of the optical pickup head 910 generates detector signal A, B, C and D, the operation unit 920 calculates the detector signal A, B, C and D so that the focus error signal FE((A+C)−(B+D)) or the main push pull signal MPP((A+D)−(B+C)) is acquired. The peak-to-peak value of the focus error signal FEpp or the peak-to-peak value of the main push pull signal MPPpp is acquired after the focus error signal FE or the main push pull signal MPP is inputted to the peak-to-peak value detector 930. Then the logic comparison unit 940 compares the peak-to-peak value detected by the peak-to-peak value detector 930 with the peak-to-peak value signal stored in the memory 950 and calculates the optimal compensated value for astigmatism. Thereon the control unit 960 outputs a control signal to the astigmatism compensator 970 for compensating the astigmatism AS45 and the astigmatism AS0 of the optical storage system.

Figure 10:
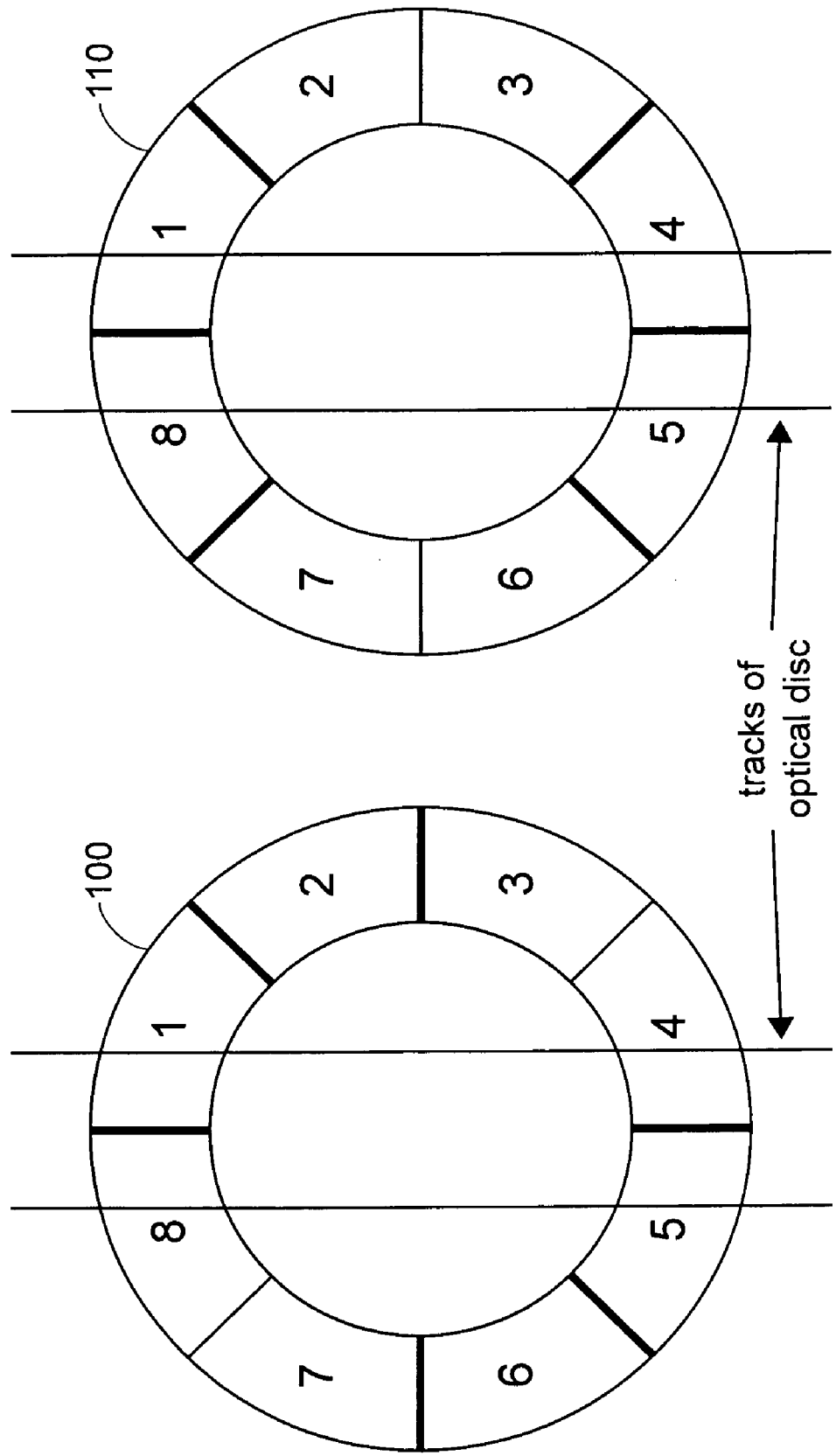
FIG. 10 is a diagram illustrating the detailed structure of the astigmatism compensator 970.

Besides, the astigmatism compensator 970 is composed of liquid crystal. The refractive index of the astigmatism compensator 970 is varied with the inputted voltage level to attain the purpose of compensating astigmatism AS45 and astigmatism AS0. The detailed structure of the astigmatism compensator 970 is as shown in FIG. 10. It's divided into eight blocks. To compensate astigmatism AS45, the blocks 1, 2, 5 and 6 of the AS45 astigmatism compensator 100 are biased, i.e. the refractive index of the blocks 1, 2, 5 and 6 are adjusted while the refractive index of the block 3, 4, 7 and 8 are maintained so that the distortion of the light spot resulted from astigmatism AS45 is thus improved. In the same way, to compensate astigmatism AS0, the blocks 1, 4, 5 and 8 of the AS0 astigmatism compensator 110 are biased, i.e. the refractive index of the blocks 1, 4, 5 and 8 are adjusted while the refractive index of the block 2, 3, 6 and 7 are maintained so that the distortion of the light spot resulted from astigmatism AS0 is thus improved.

In conclusion, the present invention adopts the peak-to-peak value of the focus error signal FEpp as an index signal for compensating astigmatism AS45 and adopts the peak-to-peak value of the main push pull signal MPPpp as an index signal for compensating astigmatism AS0. The above two signals are the most suitable index signals for astigmatism AS45 and astigmatism AS0 respectively. However, these two index signals may be switched, i.e. the peak-to-peak value of the focus error signal FEpp may be an index signal for astigmatism AS0 while the peak-to-peak value of the main push pull signal MPPpp may be an index signal for astigmatism AS45. In addition, signals which are acquired from the photo detectors, calculated though the operation unit and then inputted to the peak-to-peak value detector may also be index signals for astigmatism. For example, the radio frequency signal (RF) may be an index signal for astigmatism AS45 or astigmatism AS0 and differential push pull signal (DPP TE) may also be an index signal for astigmatism AS45 or astigmatism AS0.

Thus, the virtue of the present invention is founding the optimal compensated value for astigmatism AS45 and astigmatism AS0 during the startup of the optical storage system. Compared with prior art that the optimal compensated value for astigmatism are provided by optical pickup head manufacturers and users may not revise the optimal compensated value for astigmatism, the optimal compensated value of the astigmatism compensator is adjusted according to the index signal for astigmatism AS45 and the index signal for astigmatism AS0 when the optical storage system proceeds track seeking. The optimal compensated value for astigmatism may be acquired according to the present invention even under the following conditions, such as environment variation, aging of the optical pickup heads, discs played or usage variation (vertical or horizontal position). The distortion of the optical signal in the optical storage system is thus improved so that the read/write quality of the optical storage system is enhanced.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for compensating astigmatism in an optical storage system, wherein the storage system comprises an astigmatism compensator, comprising:
   (a1) controlling the optical storage system focusing on an optical disc and proceeding track seeking;
   (a2) adjusting a compensated values of the astigmatism compensator and recording the compensated value as a AS0_T;
   (a3) measuring a peak-to-peak values of a main push pull signal in response to the AS0_T and recording the peak-to-peak value of the main push pull signal as a MPPpp_T;
   (a4) comparing the MPPpp_T with a MPPpp_Max stored in a memory; and
   (a5) setting a AS0_OPT equal to the AS0_T and setting the MPPpp_Max equal to the MPPpp_T if the MPPpp_Max is smaller than the MPPpp_T;
   wherein steps of (a1) to (a5) are executed a number of times to acquire a first optimal compensated value from the AS0_OPT for the astigmatism compensator to compensate an astigmatism AS0.

2. The method for compensating astigmatism in an optical storage system according to claim 1 wherein the astigmatism compensator comprises an AS45 astigmatism compensator and an AS0 astigmatism compensator.

3. The method for compensating astigmatism in an optical storage system according to claim 2 further comprising:
   (b1) controlling the optical storage system focusing on the optical disc;
   (b2) adjusting the compensated value of the astigmatism compensator and recording the compensated value as a AS_T;
   (b3) measuring a peak-to-peak value of a focusing error signal in response to the AS_T and recording the peak-to-peak value of the focusing error signal as a FEpp_T;
   (b4) comparing the FEpp_T with a FEpp_Min stored in the memory; and
   (b5) setting a AS45_OPT equal to the AS_T and setting the FFpp_Min equal to the FEpp_T if the FEpp_Min is larger than the FEpp_T;
   wherein steps of (b1) to (b5) are executed a number of times to acquire a second optimal compensated value from the AS45_OPT for the astigmatism compensator to compensate an astigmatism AS45.

4. An apparatus for compensating astigmatism in an optical storage system, comprising:
   a control unit capable of adjusting a compensated values;
   an astigmatism compensator, connected to the control unit for compensating astigmatism in response to the compensated values;
   an optical pickup head, including a photo detector which generating a detector signal;
   an operation unit, connected to the optical pickup head for receiving the detector signal and generating a main push pull signal;
   a peak-to-peak value detector, connected to the operation unit for detecting a peak-to-peak values of the main push pull signal in response to the compensated values;
   a memory capable of recording a first peak-to-peak value and a first optimal compensated value;
   a logic comparison unit, connected to the peak-to-peak value detector and the memory, capable of receiving and comparing the peak-to-peak values of the main push pull signal and the first peak-to-peak value and setting the first optimal compensated value equal to the adjusted compensated value and setting the first peak-to-peak value equal to the peak-to-peak value of the main push pull signal if the first peak-to-peak value is smaller than the peak-to-peak signal of the main push pull signal;
   wherein the control unit is connected to the logic comparison unit and is capable of adjusting the compensated value a number of time and then providing the first optimal compensated value to the astigmatism compensator for compensating an astigmatism AS0 of the astigmatism compensator.

5. The apparatus according to claim 4 wherein the astigmatism compensator comprises an A45 astigmatism compensator and an A0 astigmatism compensator.

6. The apparatus according to claim 5 wherein the apparatus further comprises:
   the control unit capable of adjusting the compensated value;
   the operation unit capable of generating a focusing error signal;
   the peak-to-peak value detector capable of detecting a peak-to-peak value of the focusing error signal in response to the compensated value;
   the memory capable of recording a second peak-to-peak value and a second optimal compensated value; and
   the logic comparison unit, connected to the peak-to-peak value detector and the memory, capable of receiving and comparing the peak-to-peak value of the focusing error signal and the second peak-to-peak value and setting the second optimal compensated value equal to the adjusted compensated value and setting the second peak-to-peak value equal to the peak-to-peak value of the focusing error signal if the second peak-to-peak value is larger than the peak-to-peak signal of the focusing error signal;
   wherein the control unit is connected to the logic comparison unit and is capable of adjusting the compensated value a number of time and then providing the second optimal compensated value to the astigmatism compensator for compensating an astigmatism AS45 of the astigmatism compensator.

* * * * *